United States Patent [19]

Bequet et al.

[11] Patent Number: 4,828,330
[45] Date of Patent: May 9, 1989

[54] BRAKE CORRECTOR SUBJECT TO THE LOAD OF A VEHICLE

[75] Inventors: Franck Bequet, Créteil; Jean-Charles Maligne, Aubervilliers; Roland Levrai, Stains, all of France

[73] Assignee: Bendix France, Drancy, France

[21] Appl. No.: 93,856

[22] Filed: Sep. 4, 1987

[30] Foreign Application Priority Data

Sep. 18, 1986 [FR] France .................. 86 13075
Feb. 26, 1987 [FR] France .................. 87 02537

[51] Int. Cl.$^4$ ............................... B60T 8/30
[52] U.S. Cl. ......................... 303/22.1; 303/22.5; 303/22.8; 303/9.69; 188/195
[58] Field of Search ............ 303/22 A, 22 R, 6 C, 303/9.69, 22.1, 22.8, 22.5, 9.62, 9.64; 188/195, 349, 2 A

[56] References Cited

U.S. PATENT DOCUMENTS

| | | | |
|---|---|---|---|
| 4,325,581 | 4/1982 | Pickering | 188/195 |
| 4,423,909 | 1/1984 | Page et al. | 303/23 R |
| 4,441,590 | 4/1984 | Giorgetti | 303/22 R |
| 4,615,566 | 10/1986 | Perrin | 303/6 C |
| 4,707,036 | 11/1987 | Farr | 303/22 R |

FOREIGN PATENT DOCUMENTS

| | | |
|---|---|---|
| 0029398 | 5/1981 | European Pat. Off. . |
| 0088857 | 9/1983 | European Pat. Off. . |
| 0156666 | 10/1985 | European Pat. Off. . |
| 2815527 | 10/1978 | Fed. Rep. of Germany .... 303/22 R |
| 3329140 | 2/1985 | Fed. Rep. of Germany .... 303/22 R |
| 514192 | 11/1939 | United Kingdom ............ 303/22 R |
| 2027504 | 2/1980 | United Kingdom . |

Primary Examiner—Andres Kashnikow
Assistant Examiner—Mark T. Le
Attorney, Agent, or Firm—Larry J. Palguta; Ken C. Decker

[57] ABSTRACT

Assembly consisting of a suspension element (20) and of a brake corrector (10) intended to be subject to the load of a vehicle, the corrector (10) comprising a body in which slides a piston (12) forming a shutter element capable of opening or closing a hydraulic passage between an inlet (14) and an outlet (16) of the corrector, the piston (12) being connected by a connection mechanism to a spring mechanism (23) of the suspension element (20), characterized in that the connection mechanism comprises a lever (24) mounted on the suspension element (20) between two pivoting elements (28; 32) which are subjected to the force exerted by the suspension element (20) and which are arranged so as to transmit some of the force to the lever (24).

4 Claims, 2 Drawing Sheets

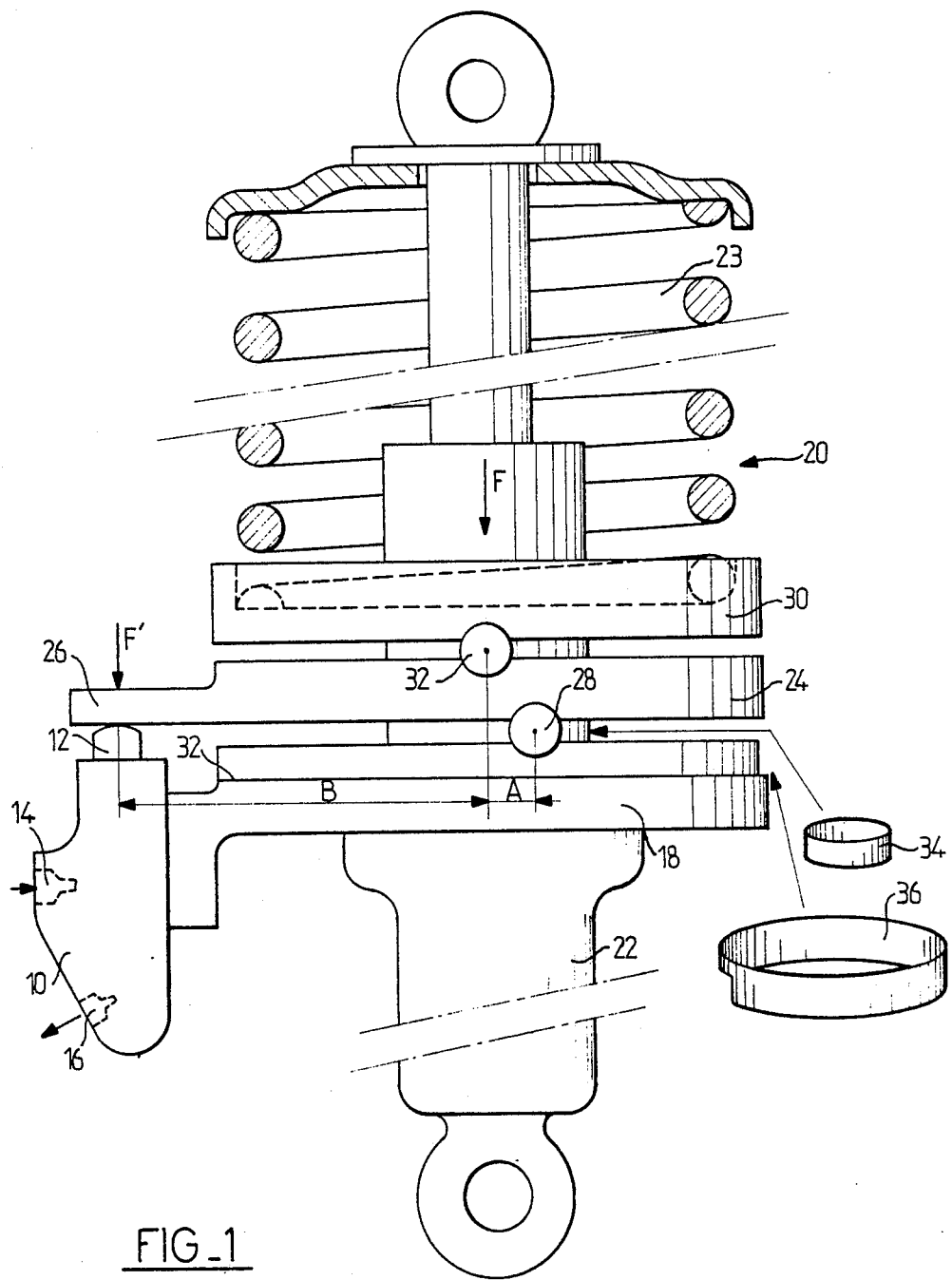
FIG_1

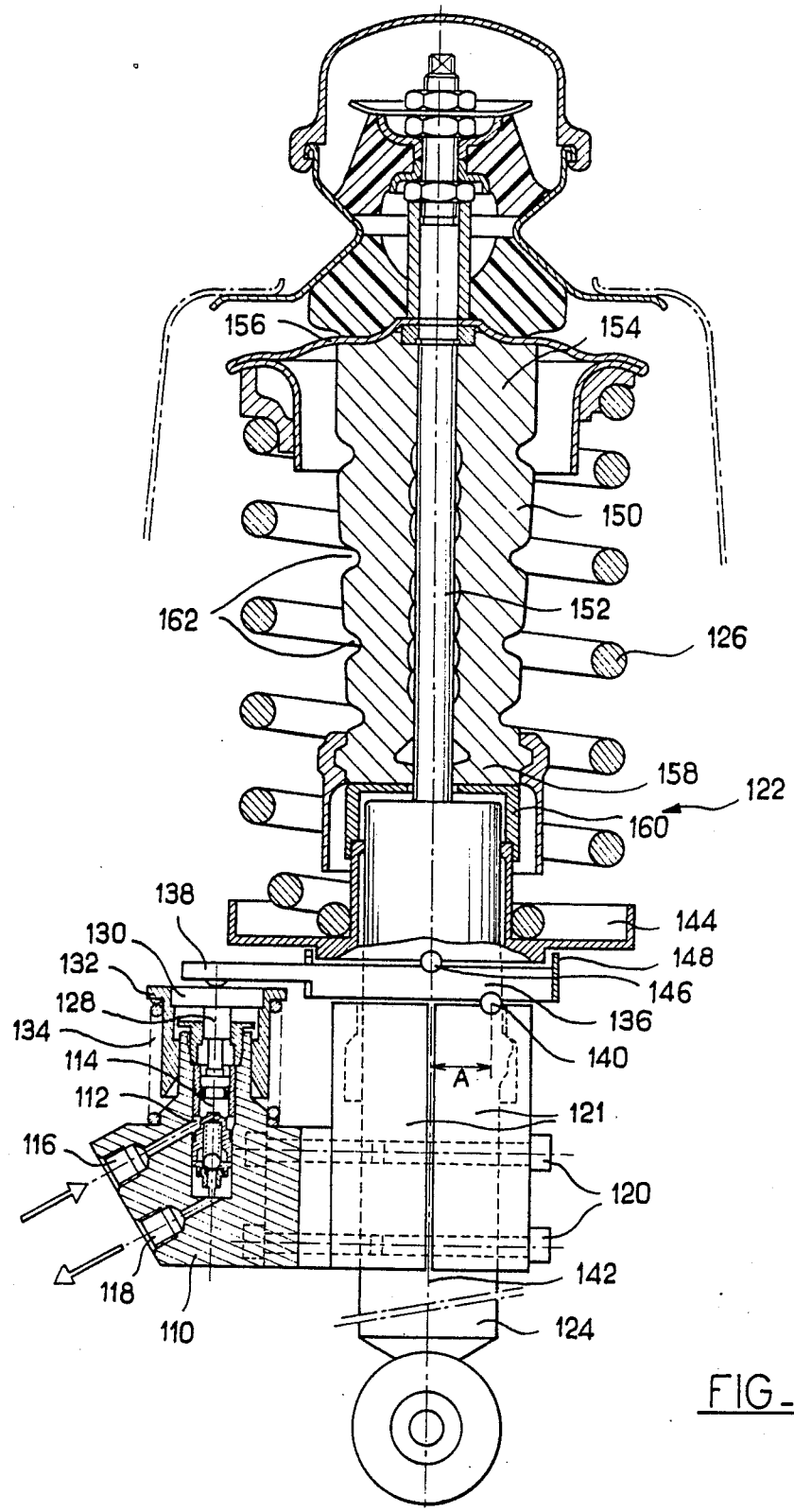
FIG_2

BRAKE CORRECTOR SUBJECT TO THE LOAD OF A VEHICLE

The present invention relates to brake correctors and more particularly to such a corrector subject to the load of a vehicle.

To save space and limit the number of components required, it is desirable to connect a brake corrector directly to the suspension spring of a vehicle, in order to vary the braking of the vehicle wheels as a function of its load.

The document GB-A-No. 1,577,029 makes known a brake corrector which is subject to the load of a vehicle and which is arranged at one end of a suspension spring of the vehicle and is connected to the spring by means of an assembly of cams, so as to vary the brake pressure as a function of the vehicle load. This device has disadvantages in that it comprises a large number of components, thus making it fragile, expensive and unreliable.

It is therefore an object of the invention to provide a brake corrector which is subject to the load of a vehicle and which has a simple construction, low production costs and increased reliability.

According to the present invention, there is provided an assembly consisting of suspension element and of a brake corrector intended to be subject to the load of a vehicle, the corrector comprising a body in whcih slides a piston forming a shutter element capable of opening or closing a hydraulic passage between an inlelt and an outlet of the corrector, the piston being connected by a connection means to a spring means of the suspension element, characterized in that the connection means comprises a lever mounted on the suspension element between two pivoting elements which are subjected to the force exerted by the suspenson element and which are arranged so as to transmit some of the force to the lever.

The invention will now be described by way of example with reference to the accompanying drawings, in which:

FIG. 1 is a diagrammatic view of a corrector subject to the load of a vehicle, according to a first embodiment of the invention; and FIG. 2 is a diagrammatic view of a second embodiment of a corrector according to the invention.

As shown in FIG. 1, a brake corrector subject to the load of a vehicle comprises a corrector body 10 in which slides a piston 12 forming a shutter element in a hydraulic passage (not shown) between an inlet 14 and an outlet 16. The inlet 14 is intended to be connected to a hydraulic transmitter (not shown), for example a mster cylinder, and the outlet 16 is intended to be connected to a hydraulic receiver (not shown), for example the rear-wheel brakes of the vehicle. The piston 12 is movable between a position opening the hydraulic passage and a position closing this passage.

The corrector body 10 is attached to an annular element 18 mounted fixedly on a suspension assembly 20. A second annular element 24 is mounted with play about the shock-absorber 22 and has an extension 26 which interacts with the piston 12 of the corrector. The second annular element 24 is mounted pivotably on the first annular element 18 by means of two aligned rollers 28, only one of which is shown in the Figure and which are received in grooves in each annular element. The center of each roller 28 is located at a distance A from the longitudinal axis of the suspension assembly 20.

A dish-shaped annular element 30 is mounted with play about the shock-absorber 22 and interacts with the second annular element 24 by means of two aligned rollers 32, only one of which is shown in the Figure and which are mounted on the longitudinal axis of the suspension assembly 20 in grooves in the two elements 24, 30.

One end of the suspension spring 23 is received in the annular element 30. The suspension assembly 20 is intended to be mounted between a suspended part of the vehicle and the vehicle chassis (not shown).

Two rings 34 and 36 are arranged on the device, one 34 within the second annular element and the other 36 on a collar 37 on the outside, in order to retain the rollers 28 and 32. The ring 36 can be made of elastomeric material.

The longitudinal axis of the piston 12 of the corrector is located at a distance B from the axis of the suspension assembly 20. Thus, a force F exerted by the vehicle load on the annular element 30 exerts a force $F = F \times (A/A + B)$ on the piston 12 of the corrector. Because the distance A, which is of the order of 5 mm, is only slight in relation to the distance B which is approximately 70 mm in a touring car, the force exerted on the piston 12 of the corrector is also only slight. This arrangement makes it possible to use a current series-production corrector without modification and a series-production suspension assembly requiring only slight modifications.

Some vehicles are equipped with a spring/shock-absorber assembly, in which the shock absorber comprises a sleeve made of elastomeric material and mounted on the rod of the piston of the shock absorber. With such an assembly, it is desirable that the force transmitted to the corrector should accurately reflect the suspension force. This result is obtained with the brake corrector illustrated in FIG. 2 and described below.

As shown in this Figure, a brake corrector subject to the load of a vehicle comprises a corrector body 110 having a bore 112, in which is slideably mounted a piston 114 forming, in a way known per se, a shutter element in a hydraulic passage between a fluid inlet 116 and a fluid outlet 118. The inlet 116 is intended to be connected to a hydraulic transmitter (not shown), for example a master cylinder, and the outlet is intended to be connected to a hydraulic receiver (not shown), for example the rear-wheel brakes of the vehicle. The piston 114 is movable between a position opening the hydraulic passage and a position closing this passage.

The body of the corrector 110 is attached, by means of screws 120 and two shells 121, to a suspension assembly 122 which comprises a shock absorber 124 and a suspension spring 126.

The piston 114 has a head 128 which projects outside the body of the corrector 110. A cup-shaped element 130 is mounted slideably about the corrector body 110 and bears on the head 128 of the piston 114. The element 130 has an annular collar 132, on which bears a spring 134 mounted on the body of the corrector 110.

An annular element 136 forming a lever is mounted with play about the shock absorber 124 and has an extension 138 which interacts with the cup-shaped element 130. The annular element 136 is mounted pivotably on the shock absorber 124 by means of two aligned rollers 140, only one of which is shown in the Figure. The center of each roller 140 is located at a distance A from the longitudinal axis 142 of the suspension assembly 122.

A second annular element 144 is mounted slideably, with slight play, about the shock absorber 124 and interacts with the first annular element 136 by means of two aligned rollers 146, only one of which is shown in the Figure, these being mountd in the longitudinal axis 142 is grooves in the two elements 136, 144. The rollers 146 are held in place by means of a raised annular edge 148 of the first annular element 136.

One end of the suspension spring 126 is received in the second annular element 144. The suspension assembly 122 is intended to be mounted between a suspended part of the vehicle and the chassis of the latter (these are not shown).

The device has a sleeve 150 made of elastomeric material, mounted about a rod 152 of the piston of the shock absorber 124. One end 154 of the sleeve 150, namely that at the top, as seen in the drawing, is mounted fixedly on an abutment 156 which, in the example illustrated, is integral with the chassis of the vehicle. The axial length of the sleeve 150 is selected so that, when the vehicle on which the device is mounted is empty, the other end 158 of the sleeve 150 does not come up against a dish 160 mounted fixedly on the second annular element 144.

When the vehicle is loaded or when the vehicle suspension absorbs the shock of a jolt, the suspension assembly 122 is compressed axially and the end 158 of the sleeve 150 comes up against the dish 160. The compression of the suspension assembly 122 beyond this point causes the compression at both the suspension spring 126 and the sleeve 150. The sleeve 150 has circumferential notches 162 which are spaced from one another and which ensure a progressive deformation of the sleeve 150 which is a function of the increse in load.

Thus, when the suspension assembly 122 is compressed beyond a predtermined value, the end 158 of the sleeve 150 comes up against the dish 160 and the sleeve 150 exerts an additional force on the second annular element 144. In the main patent application, this combination of forces is transmitted to the piston 114 of the corrector by means of the extension 138.

The compression of the suspension spring 126 is substantially linear as a function of the load which it undergoes, while the characteristic of the spring/sleeve assembly 126-150 can be selected so as to be non-linear with the load.

The piston 114 of the corrector 110 thus receives a force which, by means of the present invention, reflects the actual suspension force more accurately.

The sleeve 150 could be replaced by a spring means, for example a helical spring.

We claim:

1. An assembly comprising a suspension element having a force-transmitting longitudinal axis along which a force is exerted and a brake corrector comprising a body in which slides a piston forming a shutter element capable of controlling a hydraulic passage between an inlet and an outlet of the corrector, the piston being connected by connection means to spring means of the suspension element, the connection means comprising a lever mounted on the suspension element between two pivoting elements which are subjected to the entire force exerted by the spring means and which are arranged so that the lever transmits a proportional amount of the entire force to the corrector, the spring means being a coil spring having said force-transmitting longitudinal axis, one of the pivoting elements arranged on the force-transmitting longitudinal axis of the coil spring, the assembly including an annular-shaped element disposed between the spring means and the lever, and one of the pivoting elements located between the annular-shaped element and lever.

2. The assembly according to claim 1, wherein the annular-shaped element is attached non-pivotably to the suspension element and includes a groove for the one pivoting element.

3. The assembly according to claim 1, wherein the assembly includes second spring means mounted on the suspension element so as to exert an additional force on the lever when the suspension element undergoes a force which exceeds a predetermined threshold value.

4. An assembly comprising a suspension element having a force-transmitting longitudinal axis along which a force is exerted and a brake corrector comprising a body in which slides a piston forming a shutter element capable of controlling a hydraulic passage between an inlet and an outlet of the corrector, the piston being connected by connection means to spring means of the suspension element, the connection means comprising a lever mounted on the suspension element between two pivoting elements which are subjected to the entire force exerted by the spring means and which are arranged so that the lever transmits a proportional amount of the entire force to the corrector, the spring means being a coil spring having said force-transmitting longitudinal axis, one of the pivoting elements arranged on the force-transmitting longitidinal axis of the coil spring, the lever having a substantially annular shape and mounted about the suspension element, and the pivoting elements each comprising a roller mounted in a corresponding groove in the lever.

* * * * *